Patented Apr. 7, 1936

2,036,487

UNITED STATES PATENT OFFICE 2,036,487

HALOGENATED INDIGOS

Theodore L. Masterson, Snyder, N. Y., assignor to National Aniline & Chemical Company, Inc., New York, N. Y., a corporation of New York No Drawing. Application May 11, 1933, Serial No. 670,512

17 Claims. (Cl. 260—52)

This invention relates to halogenated indigos, and more particularly to improvements in the process of manufacturing halogenated indigos involving reduction of a halogenated dehydroindigo compound.

It is known when indigo or a homologue or lower halogen derivative is subjected to the action of a halogen under anhydrous conditions and in the presence of an acid binding salt (capable of reacting with hydrogen halides to liberate a weaker acid), a halogen compound of indigo is not produced but there is formed a halogenated compound of the corresponding dehydroindigo, generally in the form of a quaternary ammonium salt. It is further known that such halogenated dehydroindigo compounds can be converted to the corresponding halogenated indigo or leuco compounds thereof by treatment with certain reducing agents.

Among the objects of the present invention are the provision of improvements in the processes of making halogenated indigo compounds that include the reduction of a halogenated dehydroindigo compound, whereby greater yields of halogenated indigo compounds are obtained, whereby purer products are obtained, and whereby said processes may be carried out with fewer operations and manipulations and with less equipment.

Another object of the invention is to provide improvements in the production of chlorine derivatives of indigo, and especially 5, 5', 7, 7'-tetrachlor-indigo (Brilliant Indigo B—"Colour Index" No. 1190), by the chlorination of indigo under anhydrous conditions in the presence of an acid binding salt of a weak acid, followed by reduction of the resulting chlorinated dehydroindigo quaternary ammonium salt, whereby the product is obtained in a purer form and in greater yield than was heretofore obtainable by said process, and whereby the process may be carried out with greater efficiency, with less manipulations and handling, and with less equipment.

Other objects of the invention will in part be obvious and will in part appear hereinafter.

The invention will be described as embodied in the production of chlorinated indigos from indigo, but it will be understood that the invention is not limited thereto and that various changes within the scope of the appended patent claims may be made in the nature and proportions of reacting ingredients, manipulations, order of steps, reacting conditions and the like.

Indigo is reacted with chlorine in an anhydrous organic dispersing medium (solvent or suspension medium) containing a metal salt capable of binding hydrogen chloride, whereby there is produced a reaction mixture containing a chlor-dehydroindigo compound.

In accordance with one feature of the present invention, the resulting chlor-dehydroindigo compound is reduced to a chlorinated indigo while still contained in the reaction mixture. I have found, by carrying out the reduction of the chlor-dehydroindigo compound without previously isolating it from the reaction mixture, the yield of chlorindigo is greater, the quality is superior, and the manipulations and equipment necessary for carrying out the process are less. In addition the costly and troublesome separation of the chlor-dehydroindigo and its purification are avoided.

In accordance with another feature of the present invention, the chlorinated dehydroindigo compound is reduced to a chlorinated indigo with the aid of sulfur dioxide, and preferably by heating the chlor-dehydroindigo compound with sulfurous acid.

In the preferred practice of the present invention, the chlor-dehydroindigo compound is reduced to a chlorinated indigo, while still contained in the reaction mixture, by heating the reaction mixture with sulfurous acid until the desired reduction is substantially complete. The resulting chlorinated indigo may be recovered in any suitable manner.

The invention will be further illustrated by the following specific example in which the parts are by weight:

*Example 1.*—Chlorine is introduced in the form of a slow stream into a well-stirred mixture of 50 parts of indigo (95.1 per cent pure), 231 parts of anhydrous sodium acetate and 1540 parts of glacial acetic acid while cooling the mixture. After about three hours, during which time about 103 parts of chlorine have been entered, the mixture is stirred at a temperature of about 25° C. to further formation of tetrachlor-dehydroindigo acetate (a quaternary ammonium salt of tetrachlor-dehydroindigo and acetic acid), as indicated by a change in the color of the reaction mass from a blue through a green to a bright canary yellow (about 14 hours). A slow current of air is then blown through the resulting solution until residual free chlorine has been removed (about 4 hours). The solution is then cooled to about 15° C., 5 parts of water are added to the cooled solution, and a slow current of sulfur dioxide is then passed into the solution while cooling it (for example, while maintaining its temperature at about 15° C.). After about 98 parts of sulfur dioxide have been entered (about 2.5 hours) the mixture is heated with good agitation to about 70° C., and maintained at said temperature for about three hours to complete the reduction of the tetrachlor-dehydroindigo acetate to tetrachlor-indigo. The reaction mass is then cooled (for example, to about 25° C.), and the resulting blue precipitate, which comprises tetrachlor-indigo, is filtered off. The filter-cake is washed with hot water to remove impurities, and then converted to a dyestuff paste or powder composition in any suitable manner.

In carrying out the process of the above example, the chlorine is employed in an amount in excess of that theoretically required to form tetrachlor-indigo, in order to obtain a high yield of tetrachlor-indigo of good quality. The chlorination is preferably carried out in an anhydrous reaction medium in order to avoid oxidation of the indigo beyond the dehydroindigo stage. During the introduction of the chlorine, and subsequently during the introduction of the sulfur dioxide, the respective reaction mixtures are preferably maintained at a relatively low temperature (specifically at about 15° to about 20° C.), in order to obtain greater solubility of said reagents and thereby complete the reactions without waste of said materials. The residual chlorine remaining in the chlorination reaction mixture is preferably removed prior to the treatment with sulfur dioxide, as otherwise the yield and quality of the tetrachlor-indigo will be adversely affected.

In carrying out the reduction of the chlorinated dehydroindigo acetate, sulfur dioxide is preferably employed in an amount in excess of that theoretically required to completely reduce the dehydroindigo compound to the corresponding indigo compound, in order to obtain optimum results. While the reduction may be carried out without the addition of water, water is preferably employed in the reduction; as otherwise the reduction tends to be incomplete, thereby decreasing the yield and the quality of the product. The reduction of the reaction mixture is preferably carried out at a temperature between about 15° C. and about 100° C. A temperature of about 65° C. to about 75° C. is preferably employed.

It will be realized by those skilled in the art that the invention is not limited to the details of the above description. Thus in carrying out the chlorination, solvents or diluents other than glacial acetic acid may be employed instead of the glacial acetic acid, or in admixture therewith or with each other (which are generically defined in the appended claims by the term "organic dispersing medium"); as for example, carbon tetrachloride, nitrobenzene, trichlorbenzene, acetic anhydride, etc. Instead of sodium acetate, sodium benzoate, borax, or other alkaline acid binding agents may be used. By employing lesser quantities of chlorine, lower chlorinated indigos may be obtained, as for example, monochlor-indigo, dichlor-indigos and trichlor-indigos. Furthermore, by replacing all or a part of the chlorine with bromine, the corresponding brom-indigos and chlor-brom-indigos may be obtained.

The invention further is not limited to the treatment of indigo but may be employed in the production of halogenated derivatives of homologues of indigo, and in the production of higher halogenated indigos from lower halogenated indigos. Thus, instead of the indigo employed in the above example, there may be employed alkyl indigos (as for example, dimethyl-indigo, diethyl-indigo, etc.), naphthyl-indigos (as for example, dinaphthyl-indigo), monobrom-indigo, dibrom-indigo, tribrom-indigo, monochlor-indigo, dichlor-indigo, trichlor-indigo, monobrom-monochlor-indigo, dibrom-monochlor-indigo, dichlor-monobrom-indigo, monochlor-dimethyl-indigo, monobrom-dimethyl-indigo, monochlor-diethyl-indigo, etc.

Since, in the practice of the invention, changes may be made in the details of the process and in the material treated, it is intended that all matter contained in the above description shall be interpreted as illustrating, and not as limiting, the invention.

It is further to be understood that the following claims are intended to cover, in addition to the generic and specific features of the invention herein described, all statements of the scope of the invention which, as a matter of language, might be said to fall therebetween.

I claim:

1. In the production of a halogenated indigo compound by the treatment of an indigo compound with a halogen in an anhydrous organic dispersing medium and in the presence of an acid binding agent, whereby a reaction mixture containing a halogenated dehydroindigo salt is produced, the improvement which comprises subjecting said halogenated dehydroindigo salt to reduction while contained in said reaction mixture.

2. In the production of a halogen indigo compound by the treatment of an indigo compound with a halogen in an anhydrous organic dispersing medium and in the presence of an acid binding agent, whereby a reaction mixture containing a halogenated dehydroindigo salt is produced, the improvement which comprises subjecting said halogenated dehydroindigo salt to the reducing action of sulfur dioxide while contained in said reaction mixture.

3. In the production of a halogenated indigo compound by the treatment of an indigo compound with a halogen in an anhydrous organic dispersing medium and in the presence of an acid binding salt of an acid weaker than hydrochloric acid, whereby a reaction mixture containing a halogenated dehydroindigo salt of the weak acid is produced, the improvement which comprises adding sulfurous acid to the reaction mixture and heating the resulting mass, whereby the halogenated indigo compound is produced.

4. In the production of a chlorinated indigo compound by the treatment of an indigo compound with chlorine in an anhydrous organic dispersing medium and in the presence of an acid binding agent, whereby a reaction mixture containing a chlorinated dehydroindigo salt is produced, the improvement which comprises subjecting said chlorinated dehydroindigo salt to reduction while contained in said reaction mixture.

5. In the production of a chlorinated indigo compound by the treatment of an indigo compound with chlorine in an anhydrous organic dispersing medium and in the presence of an acid binding salt of an acid weaker than hydrochloric acid, whereby a reaction mixture containing a chlorinated dehydroindigo salt of the weak acid is produced, the improvement which comprises subjecting said halogenated dehydroindigo salt to the reducing action of sulfur dioxide while contained in said reaction mixture.

6. In the production of a chlorine derivative of indigo by the treatment of an indigo compound with chlorine in an anhydrous organic dispersing medium and in the presence of an acid binding salt of an acid weaker than hydrochloric acid, whereby a reaction mixture containing a chlorinated dehydroindigo salt of the weak acid is produced, the improvement which comprises adding sulfurous acid to the reaction mixture and heating the resulting mass, whereby the chlorine derivative of indigo is produced.

7. The method of making tetrachlor-indigo which comprises reacting indigo with an excess of chlorine in an anhydrous organic dispersing medium and in the presence of an acid binding salt of an acid weaker than hydrochloric acid, whereby a tetrachlor-dehydroindigo salt of the weak acid is produced, removing residual chlorine from the reaction mixture, adding water and sulfur dioxide to the resulting reaction mixture, and maintaining the temperature of the resulting mass within the range of about 15° C. to about 100° C., whereby tetrachlor-indigo is produced.

8. The method of making tetrachlor-indigo which comprises reacting indigo with an excess of chlorine in glacial acetic acid and in the presence of sodium acetate, while maintaining the reaction mixture at a temperature not exceeding about 25° C., whereby tetrachlor-dehydroindigo acetate is produced, removing residual chlorine from the reaction mixture, adding water and sulfur dioxide to the resulting reaction mixture, and heating to a temperature within the range of about 65° C. to about 75° C., whereby tetrachlor-indigo is produced.

9. The method of making 5,5',7,7'-tetrachlor-indigo, which comprises passing 103 parts of chlorine in the form of a slow current into a well stirred mixture of 47.5 parts of indigo, 231 parts of anhydrous sodium acetate and 1540 parts of glacial acetic acid while maintaining the mixture at a temperature not exceeding about 20° C., stirring the resulting mixture at a temperature of about 25° C., until a bright canary yellow solution is obtained, passing a slow current of air through said solution to remove residual free chlorine, cooling the resulting solution to about 15° C., adding 5 parts of water, passing 98 parts of sulfur dioxide in the form of a slow current into the resulting solution while maintaining it at a temperature not exceeding about 25° C., heating the resulting mass at a temperature of about 70° C. until reduction is substantially complete, cooling the resulting reaction mixture, and separating the product comprising 5,5',7,7'-tetrachlor-indigo therefrom.

10. In the production of a halogenated indigo compound by the treatment of an indigo compound with a halogen in an anhydrous organic dispersing medium and in the presence of an acid binding agent, whereby a halogenated dehydroindigo salt is produced, the improvement which comprises reducing the said halogenated dehydroindigo salt to a halogenated indigo compound with sulfurous acid.

11. In the production of a halogenated indigo compound by reduction of a halogenated dehydroindigo quaternary ammonium salt, the improvement which comprises carrying out the reduction of said halogenated dehydroindigo salt to a halogenated indigo compound with the aid of sulfur dioxide.

12. In the production of a halogenated indigo compound by reduction of a halogenated dehydroindigo quaternary ammonium salt, the improvement which comprises carrying out the reduction of said halogenated dehydroindigo salt to a halogenated indigo compound with sulfurous acid as the reducing agent.

13. In the production of a chlorinated indigo compound by reduction of a chlorinated dehydroindigo quaternary ammonium salt, the improvement which comprises treating the chlorinated dehydroindigo salt with sulfur dioxide in an amount in excess of that theoretically required to reduce it completely to the chlorinated indigo compound.

14. In the production of a chlor-indigo by reduction of a chlor-dehydroindigo quaternary ammonium salt, the improvement which comprises carrying out the reduction of said chlor-dehydroindigo salt to a chlor-indigo with sulfurous acid as the reducing agent.

15. In the production of a chlor-indigo compound by the treatment of an indigo compound with chlorine in an anhydrous organic dispersing medium and in the presence of an acid binding agent, whereby a chlor-dehydroindigo salt is produced, the improvement which comprises reducing the said chlor-dehydroindigo salt to a chlor-indigo compound with sulfurous acid.

16. In the production of a chlor-indigo by reduction of a chlor-dehydroindigo acetate, the improvement which comprises treating the chlor-dehydroindigo acetate with sulfurous acid containing an amount of sulfur dioxide in excess of that theoretically required to reduce it completely to the chlorinated indigo compound.

17. In the production of a tetrachlor-indigo by the treatment of indigo with chlorine in glacial acetic acid and in the presence of anhydrous sodium acetate, whereby tetrachlor-dehydroindigo acetate is produced, the improvement which comprises reducing said tetrachlor-dehydroindigo acetate with sulfurous acid at a temperature within the range of about 15° C. to about 100° C.

THEODORE L. MASTERSON.